United States Patent [19]
Klocksiem

[11] Patent Number: 4,601,126
[45] Date of Patent: Jul. 22, 1986

[54] BUOYANT MARKING DEVICE FOR FISHERMEN

[76] Inventor: Howard W. Klocksiem, Paton, Iowa 50217

[21] Appl. No.: 605,156

[22] Filed: Apr. 30, 1984

Related U.S. Application Data

[63] Continuation-in-part of Ser. No. 494,800, May 16, 1983, Pat. No. 4,516,349.

[51] Int. Cl.⁴ ............................ A01K 93/00; B63B 21/52
[52] U.S. Cl. .................................. 43/17.5; 43/43.11; 441/6; 441/16
[58] Field of Search ................. 43/17.5, 43.1, 43.15, 43/43.11, 4, 17; 116/107; 441/6, 13, 16, 21, 23, 24, 28

[56] References Cited

U.S. PATENT DOCUMENTS

| | | | |
|---|---|---|---|
| 2,236,215 | 3/1941 | Klinitski | 43/17.5 |
| 2,547,308 | 4/1951 | Dean | 43/17.5 |
| 3,653,085 | 4/1972 | Rouner | 441/6 |
| 4,010,567 | 3/1977 | MacMillan | 43/17.5 |
| 4,234,913 | 11/1980 | Ramme | 43/17.5 |
| 4,405,303 | 9/1983 | Smith | 441/16 |
| 4,544,364 | 10/1985 | Bankston | 441/6 |

Primary Examiner—Nicholas P. Godici
Assistant Examiner—Kurt Rowan
Attorney, Agent, or Firm—Zarley, McKee, Thomte, Voorhees & Sease

[57] ABSTRACT

A buoyant marking light for fishermen is disclosed comprising a pair of buoyant body members interconnected by an elongated sleeve. A light element extends radially outwardly from the center axis of each body member. A weight element is secured within each body member directly opposite each of the light elements. A line element is secured to the elongated sleeve and is normally wrapped therearound and the free end thereof extends through an eyelet located on the sleeve and radially positioned in-between the radial positions of each of the weights. A sinker element is secured to the free end of the line.

8 Claims, 5 Drawing Figures

U.S. Patent   Jul. 22, 1986   4,601,126
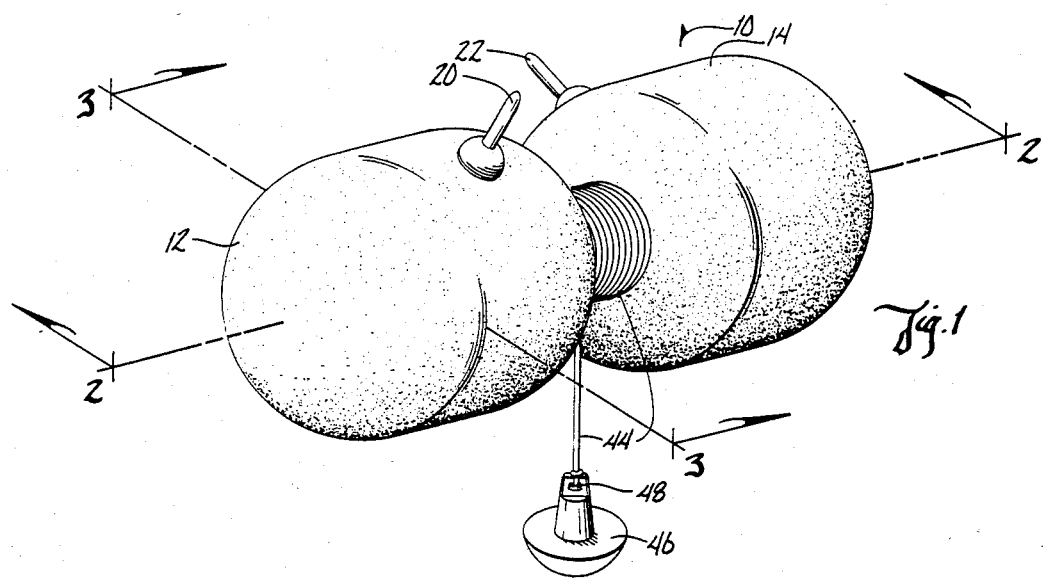
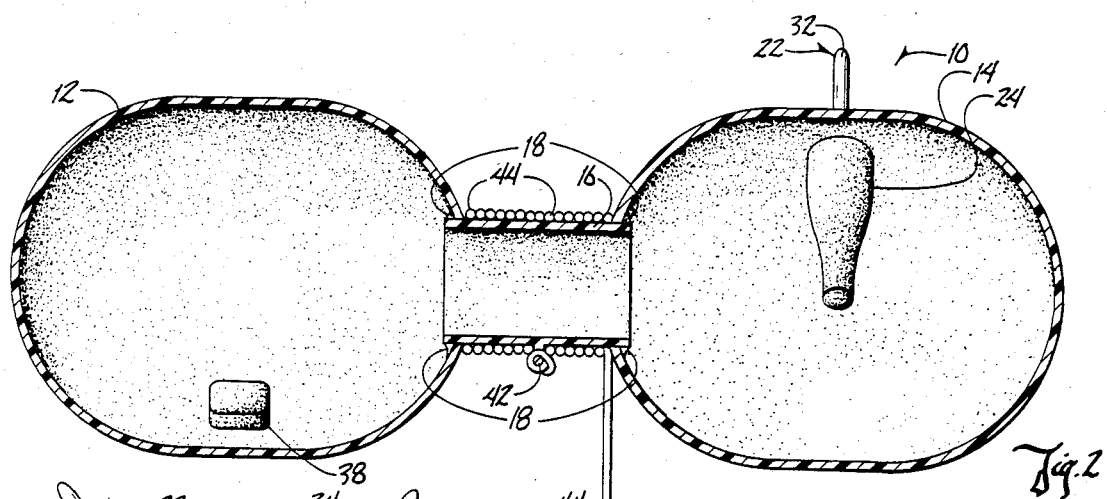
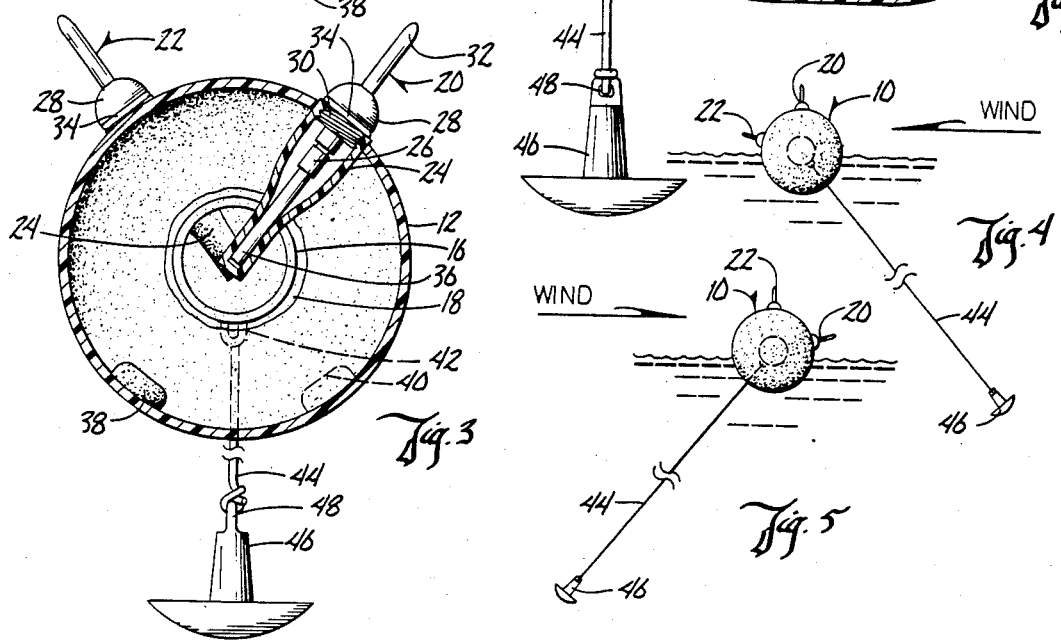

BUOYANT MARKING DEVICE FOR FISHERMEN

This is a continuation-in-part of application Ser. No. 494,800, filed May 16, 1983 now U.S. Pat. No. 4,516,349.

BACKGROUND OF THE INVENTION

Fishermen, while boat fishing at night, often encounter a school of fish in a given location. This same phenomenon occurs in both daylight and night time fishing. It is desirable to be able to mark the location of the school of fish so as to permit continual casting or fishing in that immediate area.

Marker devices of the prior art are normally comprised of some sort of buoyant means with a line attached and a sinker or anchor secured to the lower end of the line. These devices are not readily visible during night time fishing. Wind blowing against some of these devices tilts the visible portion of the marker away from the fishermen to further impair the visibility of the marker.

It is, therefore, a principal object of this invention to provide a buoyant marker light for fishermen that can be easily seen in darkness.

It is a further object of this invention to provide a buoyant marker light for fishermen which can be easily deployed and easily stored.

It is a still further object of this invention to provide a buoyant marker light for fishermen which will not have the visibility thereof impaired by wind or water currents.

It is a further object of this invention to provide a buoyant marker light for fishermen that is economical of manufacture, durable in use, and refined in appearance.

These and other objectives will be apparent to those skilled in the art.

BRIEF SUMMARY OF THE INVENTION

The device of this invention comprises a pair of buoyant body members that are connected together by an elongated sleeve of a reduced diameter. With light elements of the general character disclosed in my co-pending application Ser. No. 494,800, filed May 16, 1983, the light elements extend radially outwardly from the center axis of the body members at an angle with respect to each other.

Weights are secured within each of the body members at a position directly opposite the light elements. An eyelet is secured to the elongated sleeve. An elongated line is also secured to the sleeve and is normally wound therearound with the free end extending through the eyelet. The eyelet radially extends from the elongated sleeve to bisect the angle at which the light elements radially extend from the body members. A sinker element is secured to the free end of the line.

BRIEF DESCRIPTION OF THE DRAWINGS

FIG. 1 is a perspective view of the device of this invention;

FIG. 2 is an elongated sectional view thereof taken on line 2—2 of FIG. 1;

FIG. 3 is a transverse sectional view thereof taken on line 3—3 of FIG. 1;

FIG. 4 is an end elevational view thereof showing the position of the light elements when the wind is blowing in a first transverse direction; and FIG. 5 is a view similar to that of FIG. 4 but shows the position of the light elements when the wind is blowing from an opposite transverse direction.

DESCRIPTION OF THE PREFERRED EMBODIMENT

The numeral 10 generally designates the marker device of this invention which is comprised generally of hollow body members 12 and 14 which are interconnected by an elongated sleeve 16. The body members 12 and 14 are generally spherical in shape, and the sleeve 16 is generally cylindrical in shape. Sleeve 16 is connected to the body members by extending through suitable apertures therein and glue 18 or the like can be used to secure the sleeve to the body members.

Lights 20 and 22 radially extend from the center axis of the marker device 10 at a radial angle with respect to each other of approximately 90°. This angle is best shown in FIGS. 3, 4, and 5. The lights 20 and 22 are disclosed generally in the co-pending application referred to herebefore. They include tube elements 24 which are secured by any suitable means at their upper ends to the shell or periphery of the body members. Glue or the like can be used to effect this connection.

A battery receptacle 26 is secured to and extends from the lower end of cap element 28 which is threadably secured to tube element 24 by threads 30. A light element 32 is operatively secured to battery receptacle 26. A rubber seal 34 extends around the upper end of tube element 24 to seal the interior of cap element 28 and tube element 24. A detachable battery 36 is mounted in tube 24 as generally shown in FIG. 3. As disclosed in the above-described co-pending application, the light element 32 is in its dormant condition shown in FIG. 3. By threadably removing cap element 28 from tube element 24, and by reversing the position of battery 36 180° and then replacing the cap element, the light element 32 is illuminated. This structure of the light elements is old and does not, per se, comprise the invention of this application.

Weights 38 and 40 are secured by glue or any other convenient means to the interior of body members 12 and 14. As indicated in FIG. 3, the weight 38 is disposed within body member 12 at a point 180° from the position of light 20. Similarly, weight 40 is located in the same relative position in body member 14 with respect to light 22.

An eyelet 42 is secured to the longitudinal center of sleeve 16 and extends radially outwardly therefrom. As shown in FIG. 3, eyelet 42 bisects the radial angle that separates both weights 38 and 40 and lights 20 and 22.

A line 44 is tied to or otherwise secured to sleeve 16 and is normally wrapped therearound during storage. A free end of line 44 extends through eyelet 42 and is secured to sinker 46 through eyelet 48 on the upper portion of the sinker.

In operation, when a school of fish is located during night time fishing, the light elements 32 of lights 20 and 22 are illuminated in the manner described heretofore. The marker device 10 is then thrown into the water at the location of the school of fish. The weight of the sinker 46 is sufficient to allow the line 44 to unwind from sleeve 16 through eyelet 42. The marker device 10 rotates in the water as the sinker 46 seeks its lowermost position.

If the wind and the water are still, the device will assume the position best shown in FIG. 3 with the string 44 in a vertical position and the lights 20 and 22 extending radially outwardly from body members 10 and 12, respectively, at an angle of substantially 45° with respect to line 44. The downward pressure on line 44 by sinker 46 balances the rotational affect that weights 38 and 40 may have on body members 10 and 12.

When wind or moving currents coming from a direction transverse to the longtudinal axis of marker 10, as best shown in FIG. 4, the marker 10 will slightly rotate about its center axis whereupon one light will assume a substantial horizontal position, and the other light will assume a substantial vertical position. FIG. 5 shows this same relationship between the lights 20 and 22 as the wind or water current acts on the marker device 10 from an opposite transverse side. In each instance, at least one of the lights 20 or 22 is in a vertical position and is easily visible to the persons in the fishing boat even though the water currents or wind do act on the marker device. In still water, both of the lights 20 and 22 would usually be visible to the fishing boat (FIG. 3).

The ability of the device of this invention to always have one of the lights visible to the persons in the fishing boat is achieved by the angular radial positions of the lights 20 and 22 on the body members 12 and 14 as well as the radial postions of the weights 38 and 40, and the eyelet 42.

It is preferred that the outer surfaces of at least the body members 12 and 14 be coated with a luminous paint that will pick up and reflect any available light, and particularly the light from lights 20 and 22.

When the fishing operation has ceased, the marker device 10 is retrieved, and the line 44 is wound around the sleeve 16 for storage.

The weight of sinker 46 is coordinated with the buoyancy of body members 12 and 14 so that the sinker will only partially submerge the body members in the water.

From the foregoing, it is seen that the device of this invention will achieve at least its stated objectives.

I claim:

1. A buoyant marker light for fishermen, comprising, a pair of buoyant body members,
an elongated means connecting said body members so as to define a center axis of said marker light,
light elements secured to each of said body members and protruding outwardly from said body members at a radially angular disposition with respect to each other, the angle of disposition being greater than zero degrees and less than 180 degrees.

2. The device of claim 1 wherein said light elements are removably secured to the outer surface of said body members.

3. The device of claim 1 wherein an elongated line has one end secured to said elongated means and the other end connected to a sinker means.

4. The device of claim 1 wherein said light elements radially extend from the center axis of said body members at an angle with respect to each other.

5. The device of claim 4 wherein weight elements are secured to said body members at points substantially opposite to the points where said light elements radially extend from said body members.

6. The device of claim 5 wherein an eyelet is secured to said elongated means at a radial position equally spaced from the radial positions of said light elements and said weight elements.

7. The device of claim 1 wherein said elongated line is adapted to be wound around said elongated element.

8. The device of claim 1 wherein said body members are colored on their outside surface with an illuminated color coating.

* * * * *